(12) United States Patent
Hunsaker et al.

(10) Patent No.: US 11,113,402 B2
(45) Date of Patent: Sep. 7, 2021

(54) TUNNELING FUNCTIONAL SAFETY COMMUNICATIONS OVER AN ENHANCED SERIAL PERIPHERAL INTERFACE

(71) Applicant: Intel Corporation, Santa Clara, CA (US)

(72) Inventors: Mikal Hunsaker, El Dorado Hills, CA (US); Mark Feuerstraeter, Granite Bay, CA (US); Asad Azam, Folsom, CA (US); Zhenyu Zhu, Folsom, CA (US); Navtej Singh, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 165 days.

(21) Appl. No.: 16/370,566

(22) Filed: Mar. 29, 2019

(65) Prior Publication Data

US 2019/0228160 A1     Jul. 25, 2019

(51) Int. Cl.
*G06F 9/00* (2006.01)
*G06F 15/177* (2006.01)
*G06F 21/57* (2013.01)
*G05B 9/02* (2006.01)
*G05B 19/042* (2006.01)

(52) U.S. Cl.
CPC ............. *G06F 21/575* (2013.01); *G05B 9/02* (2013.01); *G05B 19/0425* (2013.01); *G05B 19/0428* (2013.01); *G06F 21/572* (2013.01)

(58) Field of Classification Search
CPC .. G05B 19/0425; G05B 19/0428; G05B 9/02; G06F 21/572; G06F 21/575
See application file for complete search history.

(56) References Cited

U.S. PATENT DOCUMENTS

| 2014/0068275 A1* | 3/2014 | Swanson | G06F 21/575 |
| | | | 713/192 |
| 2014/0139670 A1* | 5/2014 | Kesavan | G06K 9/00791 |
| | | | 348/148 |
| 2017/0185559 A1* | 6/2017 | Hunsaker | G06F 13/4282 |
| 2019/0073478 A1* | 3/2019 | Khessib | G06F 13/4072 |
| 2019/0287588 A1* | 9/2019 | Montero | G06Q 10/00 |

OTHER PUBLICATIONS

Intel Corp., Enhanced Serial Peripheral Interface (eSPI) Interface Base Specification (for Client ans Server Platforms), Intel Manual, Jan. 2016, 133 pages, Revision 1.0, Intel Corporation.

\* cited by examiner

*Primary Examiner* — Nitin C Patel
(74) *Attorney, Agent, or Firm* — Jordan IP Law, LLC

(57) ABSTRACT

Methods, systems and apparatuses may provide for technology that includes a system on chip (SoC) having a root of trust and an embedded controller to conduct functional safety operations and non-functional safety operations with respect to the SoC. The technology may also include an enhanced serial peripheral interface (eSPI) coupled to the SoC and the embedded controller, wherein the eSPI is to tunnel communications associated with the functional safety operations between the embedded controller and the root of trust.

23 Claims, 5 Drawing Sheets

TUNNELING FUNCTIONAL SAFETY COMMUNICATIONS OVER AN ENHANCED SERIAL PERIPHERAL INTERFACE

TECHNICAL FIELD

Embodiments generally relate to functional safety testing. More particularly, embodiments relate to tunneling functional safety communications over an enhanced serial peripheral interface (eSPI).

BACKGROUND

Functional safety is an area of concern in autonomous platforms due to the unmanned nature of the platforms and the potential risk that the platforms present to end users. Conventional solutions to ensure functional safety via an agent embedded in a system on chip (SoC), may have limited visibility of platform power states, costly dedicated power rails and/or power management controllers, dependency on SoC services (e.g., read/write accesses to non-volatile memory/NVM storage, firmware/FW loads and authentication), security concerns (e.g., due to safety mission related original equipment manufacturer/OEM functions and diagnostics) and/or susceptibility to interference (e.g., common cause failure/CCF).

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
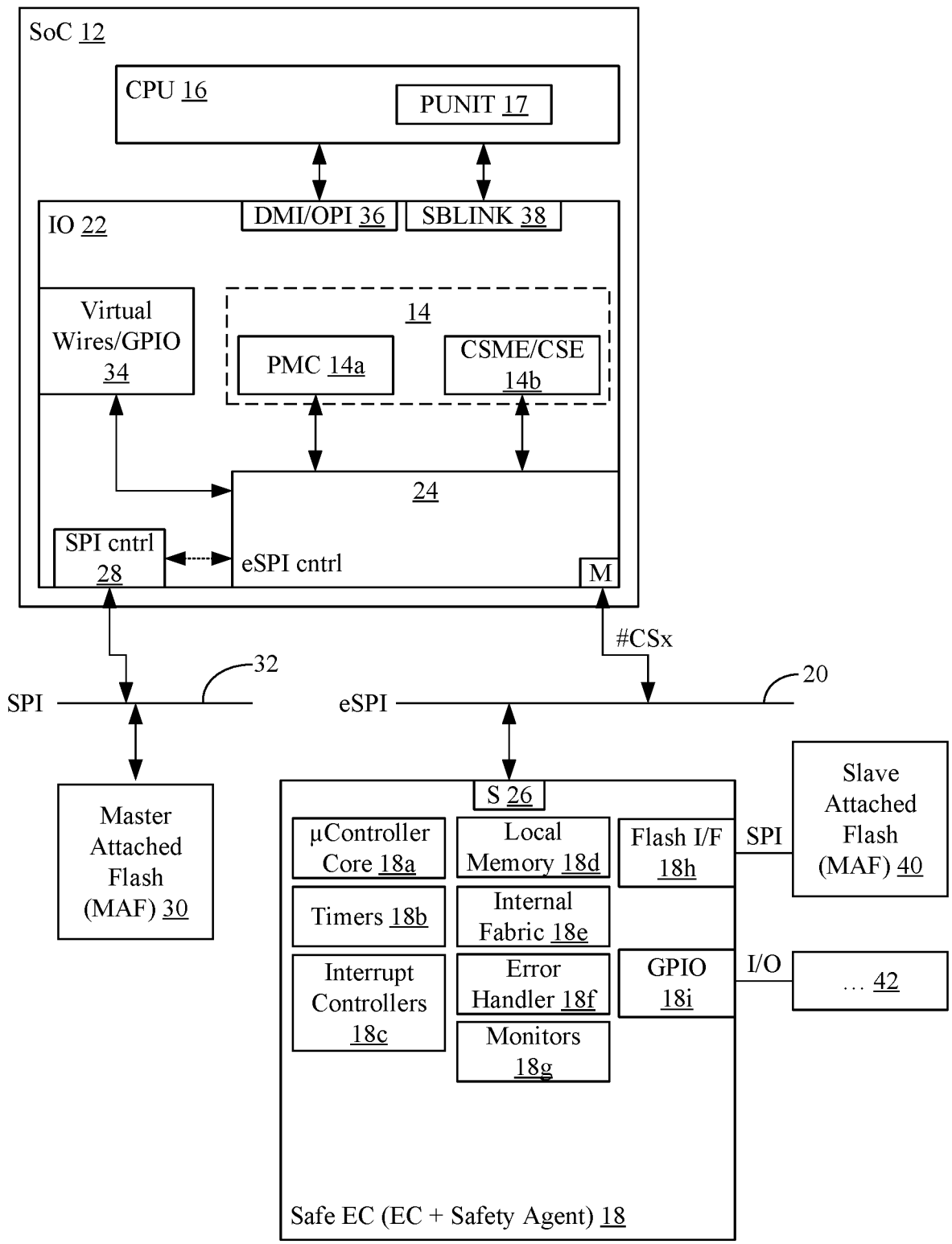
FIGS. 1-3 are block diagrams of examples of safety agent architectures according to embodiments.

FIG. 1 shows an architecture 10 in which a system on chip (SoC) 12 includes an input/output (IO) module 22 having a root of trust 14 (14a, 14b). The root of trust 14 may generally be a set of functions that are always trusted by an operating system executing on a host processor such as, for example, a central processing unit (CPU) 16 of the SoC 12. In the illustrated example, the root of trust 14 includes a power management controller (PMC, e.g., power management unit) 14a and a security unit 14b such as, for example, a converged security and management engine (CSME) and/or a converged security engine (CSE).

The illustrated architecture 10 also includes an embedded controller (EC) 18 (18a-18i) and an enhanced serial peripheral interface (eSPI) 20 coupled to the SoC 12 and the embedded controller 18. The embedded controller 18, which powers on before the SoC 12 (e.g., before basic input output system/BIOS is operational), may conduct functional safety operations such as, for example, data collection and/or monitoring operations with respect to the SoC 12. The illustrated embedded controller 18 may therefore be considered a safety agent and/or safety island for the SoC 12. In an embodiment, the embedded controller 18 also conducts non-functional safety operations such as, for example, remote access and/or configuration operations (e.g., operating as a baseboard management controller/BMC in a server).

As will be discussed in greater detail, the eSPI 20 tunnels communications (e.g., data collection traffic in the form of, for example, Management Component Transport Protocol/MCTP messages and/or embedded packets) associated with at least the functional safety operations between the embedded controller 18 and the root of trust 14, which has implicit filters to satisfy and/or maintain the trusted status of the root of trust 14. The illustrated architecture 10 therefore provides relatively high visibility of platform power states to the embedded controller 18, because the embedded controller 18 is external to the SoC 12 and powers up before the SoC 12. The illustrated architecture 10 also reduces cost because internal power rails and/or power management controllers of the SoC 12 are not dedicated to the embedded controller 18. Moreover, the embedded controller 18 is not dependent on SoC services such as, for example, read/write accesses to NVM storage, FW loads and/or authentication activities. Additionally, the tunneling obviates security concerns that may otherwise be present due to safety mission related OEM functions and diagnostics of the embedded controller 18. The architecture 10 is also less susceptible to interference such as, for example, CCFs.

The eSPI 20 may also tunnel communications associated with the non-functional safety operations between the embedded controller 18 and the root of trust 14. In the illustrated example, the IO module 22 also includes a master eSPI controller 24 that communicates with a slave controller 26 in the embedded controller 18, a serial peripheral interconnect (SPI) controller 28 that communicates with a master attached flash (MAF) 30 over an SPI 32, a general purpose input/output (GPIO) component 34 (e.g., which may include virtual wires), an in-band communication controller 36 such as, for example, a direct media interface (DMI) and/or on-package DMI (OPI) controller to communicate with the CPU 16, and a sideband (SB) link controller 38 to communicate with the CPU 16.

In an embodiment, the embedded controller 18 includes a microcontroller core 18a (e.g., dual core lockstep with comparators), one or more timers 18b (e.g., hardware and/or firmware watchdog timer/WDT), one or more interrupt controllers 18c, local memory 18d (e.g., error code correction/ECC protected static random access memory/SRAM and/or read only memory/ROM), an internal fabric 18e, an error handler 18f, one or more monitors 18g (e.g., clock monitor, voltage monitor), a flash interface (I/F) 18h to communicate with a slave attached flash (SAF), and a GPIO controller 18i to communicate with one or more IO devices 42. In addition, the embedded controller 18 may protect external bus protocols through cyclic redundancy check (CRC) procedures, use enhanced direct memory access (DMA), include a safety compliant real-time operating system (RTOS) and/or firmware, perform self-diagnostics (e.g., memory built-in self-test/MBIST, logic built-in self-test/LBIST, etc.), and so forth. Thus, the embedded controller 18 may support automotive and/or industrial uses of the SoC 12. In one example, the CPU 16 includes a power unit (PUNIT) 17 to control voltage and clock gating on the CPU 16.

Figure 2:
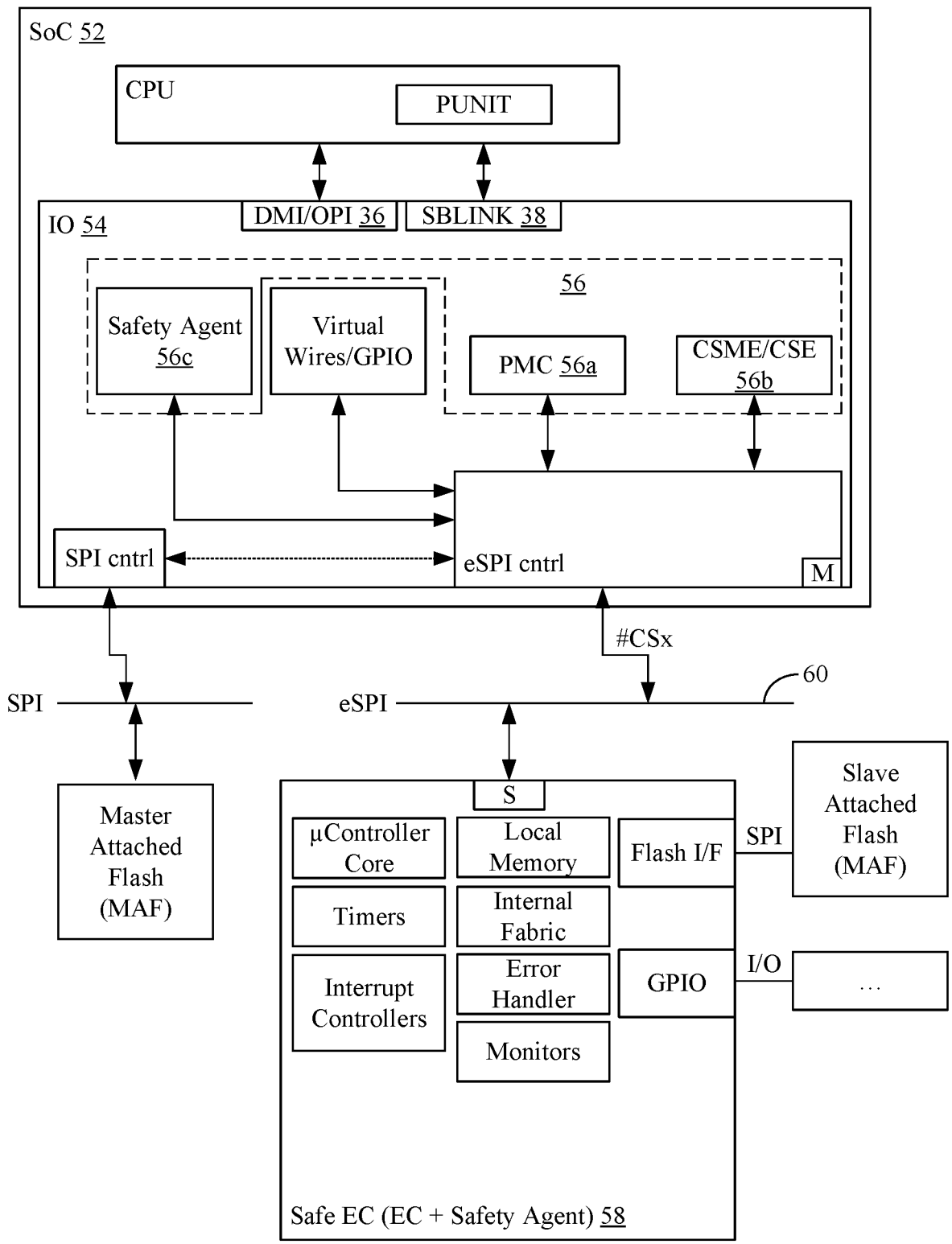

Turning now to FIG. 2, an architecture 50 is shown in which an SoC 52 includes an IO module 54 having a root of trust 56 (56a-56c). In the illustrated example, the root of trust 56 includes a PMC 56a, a security unit 56b, and an internal safety agent 56c. The illustrated architecture 50 also includes an EC 58 and an eSPI 60 coupled to the SoC 52 and the EC 58. The EC 58, which powers on before the SoC 52, may conduct functional safety operations such as, for example, data collection and/or monitoring operations with respect to the SoC 52. In an embodiment, the internal safety agent 56c also conducts functional safety operations.

The illustrated eSPI 60 tunnels communications (e.g., data collection traffic) associated with at least the functional safety operations between the embedded controller 58 and the root of trust 56, which has implicit filters to satisfy and/or maintain the trusted status of the root of trust 56. The illustrated EC 58 may therefore supplement and/or replace the safety agent/island responsibilities of the internal safety agent 56c for the SoC 52 (e.g., eliminating monitoring "blind spots"). In an embodiment, the EC 58 also conducts non-functional safety operations such as, for example, remote access and/or configuration operations.

Figure 3:
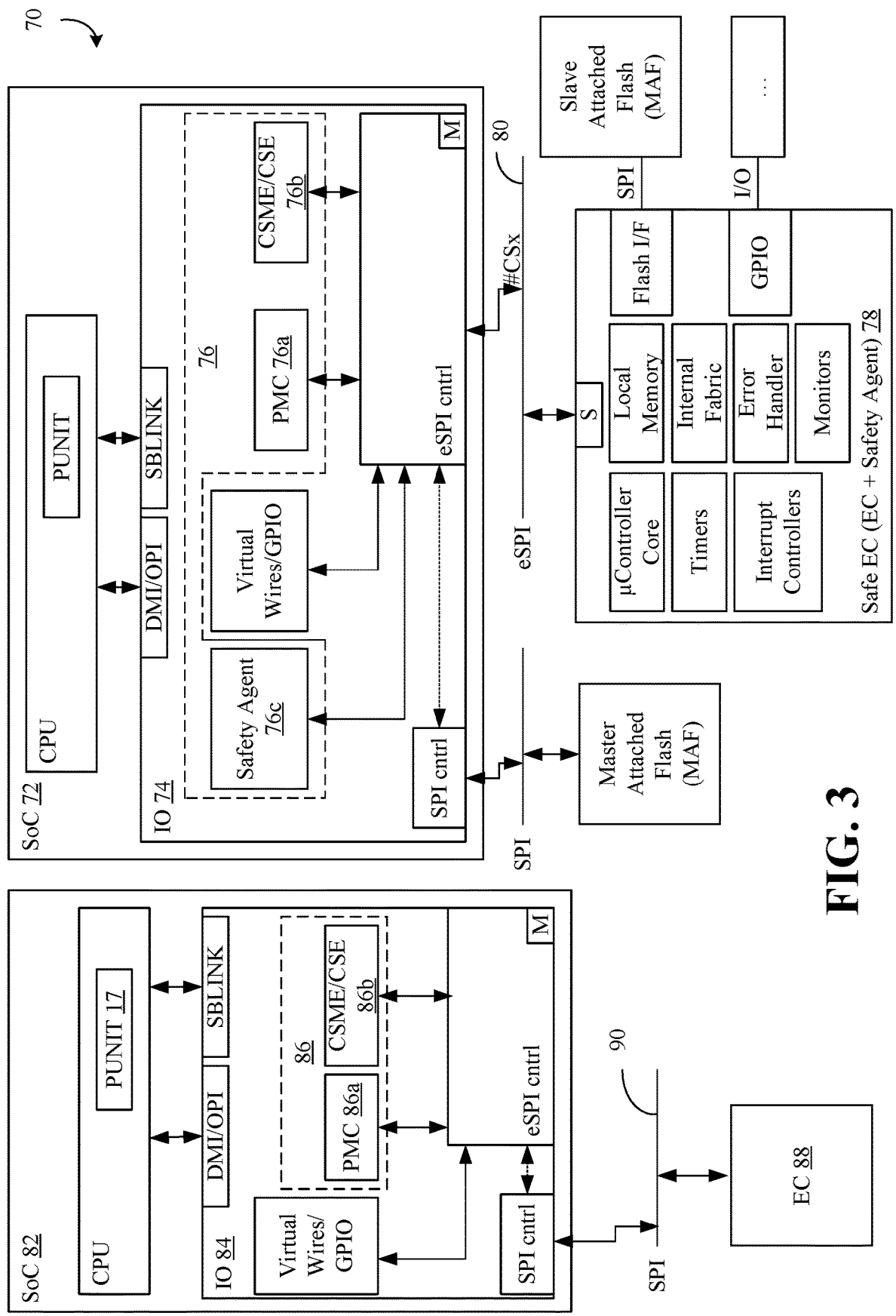

FIG. 3 shows an architecture 70 in which a first SoC 72 includes an IO module 74 having a root of trust 76 (76a-76c). In the illustrated example, the root of trust 76 includes a PMC 76a, a security unit 76b, and an internal safety agent 76c. The illustrated architecture 70 also includes an EC 78 and an eSPI 80 coupled to the first SoC 72 and the EC 78. The EC 78, which powers on before the first SoC 72, may conduct functional safety operations such as, for example, data collection and/or monitoring operations with respect to the first SoC 72. The illustrated eSPI 80 tunnels communications (e.g., data collection traffic) associated with at least the functional safety operations between the embedded controller 78 and the root of trust 76, which has implicit filters to satisfy and/or maintain the trusted status of the root of trust 76. In an embodiment, the internal safety agent 76c also conducts functional safety operations. The illustrated EC 78 may therefore supplement and/or replace the safety agent/island responsibilities of the internal safety agent 76c for the first SoC 72 (e.g., eliminating monitoring blind spots). In an embodiment, the EC 78 also conducts non-functional safety operations such as, for example, remote access and/or configuration operations.

In the illustrated example, a second SoC 82 (e.g., companion compute processor) includes an IO module 84 having a root of trust 86 (86a, 86b). The root of trust 86 may include a PMC 86a and a security unit 86b. The illustrated architecture 70 also includes an EC 88 and an eSPI 90 coupled to the second SoC 82 and the EC 88. The EC 88, which powers on before the second SoC 82, may conduct functional safety operations such as, for example, data collection and/or monitoring operations with respect to the second SoC 82. The illustrated eSPI 90 tunnels communications (e.g., data collection traffic) associated with at least the functional safety operations between the embedded controller 88 and the root of trust 86, which has implicit filters to satisfy and/or maintain the trusted status of the root of trust 86. In an embodiment, the EC 88 also conducts non-functional safety operations such as, for example, remote access and/or configuration operations. In an embodiment, the second SoC 82 supports diagnostics, cross-monitoring, voter functions, and in-field on-demand diagnostic proof testing as a combination of hardware and software components. With regard to the voter functions, the second SoC 82 might compare redundant CPU outputs in, for example, a one out of two (e.g., 1oo2, 1oo2d) architecture to achieve a certain safety integrity level (SIL) compliance (e.g., SIL-3).

Figure 4:
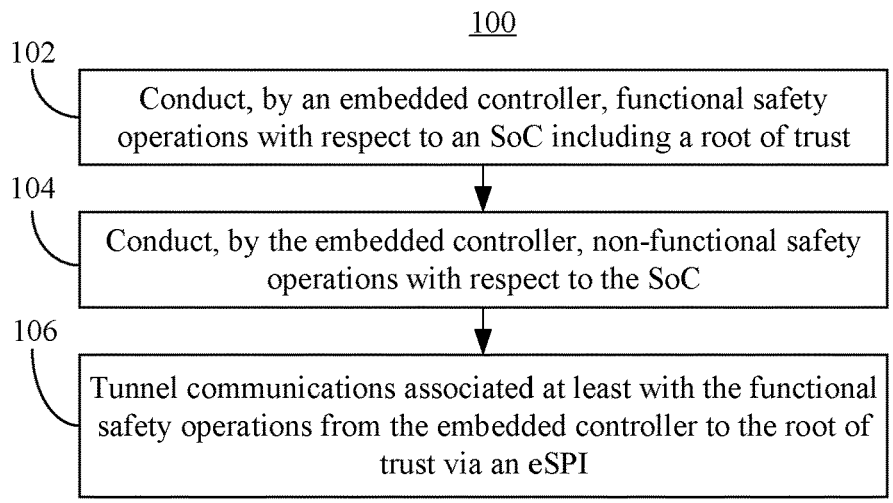
FIG. 4 is a flowchart of an example of a method of operating a safety agent architecture according to an embodiment.

FIG. 4 shows a method 100 of operating a safety agent architecture. The method 100 may generally be implemented in a safety agent architecture such as, for example, the architecture 10 (FIG. 1), the architecture 50 (FIG. 2) and/or the architecture 70 (FIG. 3), already discussed. More particularly, the method 100 may be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 100 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 102 conducts, by an embedded controller, functional safety operations with respect to an SOC including a root of trust, wherein non-functional safety operations are conducted at block 104 by the embedded controller. In an embodiment, the embedded controller conducts the functional safety operations in compliance with one or more safety requirements such as, for example, SIL-3, SIL-2, an automotive SIL (ASIL, e.g., ASIL C, ASIL D), and so forth. Blocks 102 and 104 may be conducted asynchronously and/or in parallel. Block 106 tunnels communications associated at least with the functional safety operations from the embedded controller to the root of trust via an eSPI. In an embodiment, the tunneled communications include data collection traffic. Additionally, the communications may include MCTP messages and/or embedded packets.

The illustrated method 100 therefore provides relatively high visibility of platform power states to the embedded controller because the embedded controller is external to the SoC and powers up before the SoC. The illustrated method 100 also reduces cost because internal power rails and/or power management controllers of the SoC are not dedicated to the embedded controller. Moreover, the embedded controller is not dependent on SoC services such as, for example, read/write accesses to NVM storage, FW loads and/or authentication activities. Additionally, the tunneling obviates security concerns that may otherwise be present due to safety mission related OEM functions and diagnostics of the embedded controller. The method 100 is also less susceptible to interference such as, for example, CCFs.

Figure 5:
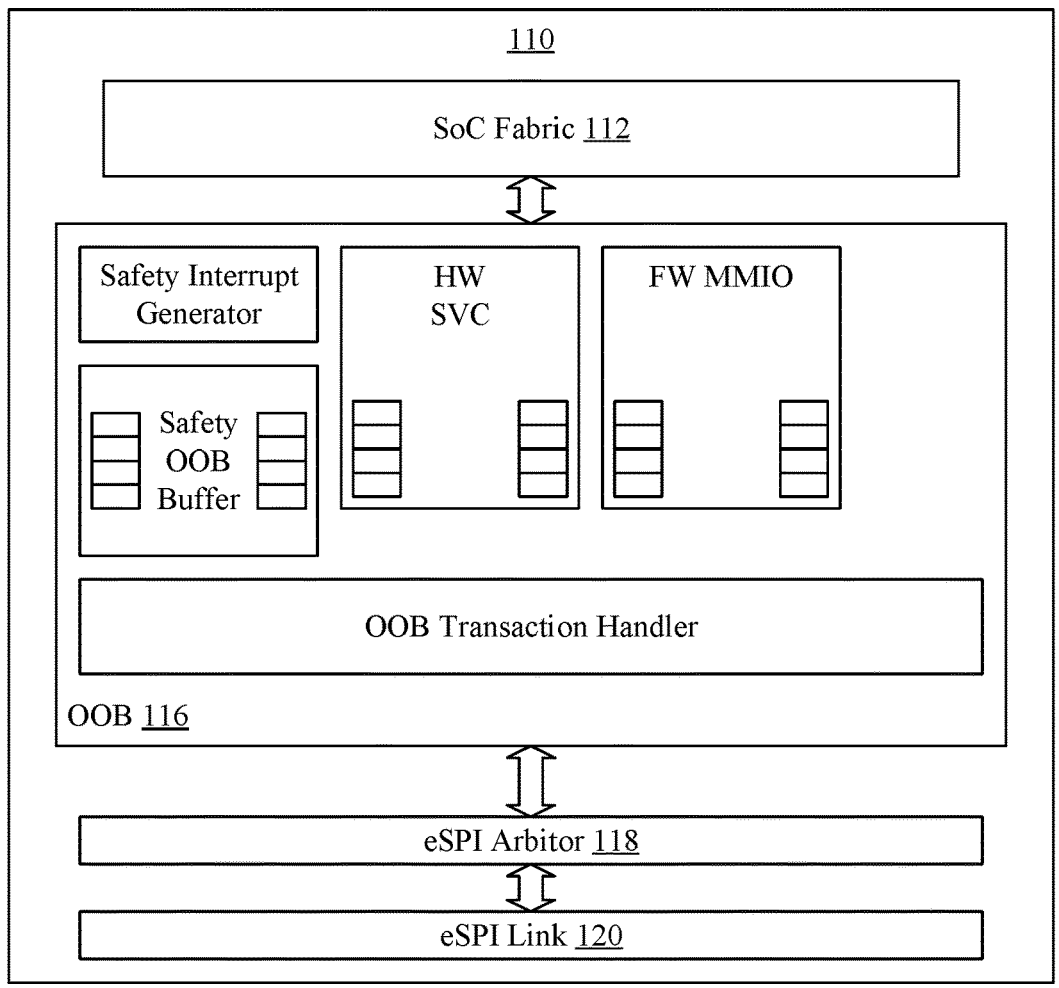
FIG. 5 is a block diagram of an example of an enhanced serial peripheral interconnect according to an embodiment.

FIG. 5 shows an eSPI 110 that may be used to tunnel communications between an embedded controller and a root of trust. In the illustrated example, an SoC fabric 112 is coupled to an out of band (OOB) interface 116 that includes an OOB transaction handler, a safety interrupt generator, a safety OOB buffer, a hardware service buffer, and a firmware MMIO (memory mapped input output) buffer. The OOB interface 116 may communicate with the embedded controller via an eSPI arbitor (e.g., transaction engine/TE) 118 and an eSPI link 120.

Figure 6:
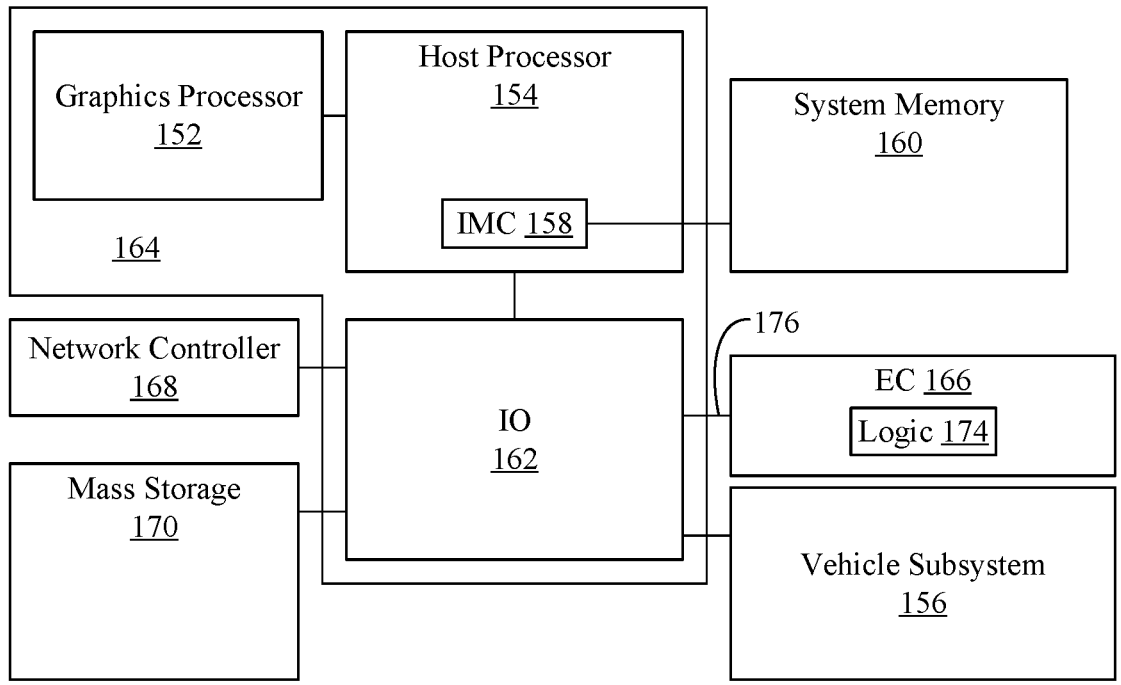
FIG. 6 is a block diagram of an example of a computing system according to an embodiment.

FIG. 6 shows a computing system 150 that may generally be part of an electronic device/system having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), etc., or any combination thereof. In the illustrated example, the system 150 includes a graphics processor 152 (e.g., graphics processing unit/GPU) and a host processor 154 (e.g., central processing unit/CPU) having an integrated memory controller (IMC) 158 that is coupled to a system memory 160.

Additionally, the illustrated system 150 includes an input output (IO) module 162 implemented together with the host processor 154, and the graphics processor 152 on an SoC 164 (e.g., semiconductor die) that includes a root of trust (not shown). In one example, the IO module 162 communicates with an EC 166, a network controller 168 (e.g., wired and/or wireless), a vehicle subsystem 156 (e.g., drive train, steering, navigation, onboard controller, electronic data recorder/EDR), and mass storage 170 (e.g., hard disk drive/HDD, optical disk, solid state drive/SSD, flash memory).

The illustrated EC 166 includes logic 174 (e.g., logic instructions, configurable logic, fixed-functionality hardware logic, etc., or any combination thereof) to perform one or more aspects of the method 100 (FIG. 4), already discussed. Thus, the logic 174 may conduct functional safety operations with respect to the SoC 164, conduct non-functional safety operations with respect to the SoC 164, and tunnel communications associated with the functional safety operations to the root of trust in the SoC 164 via an eSPI 176. In an embodiment, the communications include data collection traffic. In one example, the EC 166 is a BMC.

The illustrated system 150 is therefore considered performance-enhanced because it provides relatively high visibility of platform power states to the embedded controller 166, reduces cost, is not dependent on SoC services, obviates security concerns that may otherwise be present due to safety mission related OEM functions and diagnostics of the embedded controller 166 and/or is less susceptible to interference.

Figure 7:
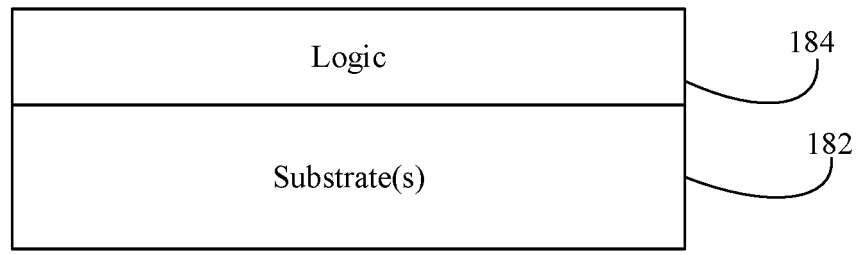
FIG. 7 is an illustration of an example of a semiconductor apparatus according to an embodiment.

FIG. 7 shows a semiconductor apparatus 180 (e.g., chip, die, package). The illustrated apparatus 180 includes one or more substrates 182 (e.g., silicon, sapphire, gallium arsenide) and logic 184 (e.g., transistor array and other integrated circuit/IC components) coupled to the substrate(s) 182. In an embodiment, the logic 184 implements one or more aspects of the method 100 (FIG. 4), already discussed. Thus, the logic 184 may conduct functional safety operations with respect to an SoC including a root of trust, conduct non-functional safety operations with respect to the SoC, and tunnel communications associated at least with the functional safety operations to the root of trust via an eSPI.

The logic 184 may be implemented at least partly in configurable logic or fixed-functionality hardware logic. In one example, the logic 184 includes transistor channel regions that are positioned (e.g., embedded) within the substrate(s) 182. Thus, the interface between the logic 184 and the substrate(s) 182 may not be an abrupt junction. The logic 184 may also be considered to include an epitaxial layer that is grown on an initial wafer of the substrate(s) 182.

Additional Notes and Examples

Example 1 includes a performance-enhanced computing system comprising a vehicle subsystem, a system on chip (SoC) coupled to the vehicle subsystem, the SoC including a root of trust, an embedded controller to conduct functional safety operations and non-functional safety operations, and an enhanced serial peripheral interconnect (eSPI) coupled to the SoC and the embedded controller, wherein the eSPI is to tunnel communications associated with the functional safety operations between the embedded controller and the root of trust.

Example 2 includes the system of Example 1, wherein the communications are to include data collection traffic.

Example 3 includes the system of Example 1, wherein the root of trust includes a security unit.

Example 4 includes the system of Example 1, wherein the root of trust includes a power management unit.

Example 5 includes the system of Example 1, wherein the root of trust includes an internal safety unit.

Example 6 includes the system of any one of Examples 1 to 5, wherein the embedded controller is to power on before the SoC.

Example 7 includes a semiconductor apparatus comprising a system on chip (SoC) including a root of trust, an embedded controller to conduct functional safety operations in compliance with one or more safety requirements and conduct non-functional safety operations, and an interface coupled to the SoC and the embedded controller, wherein the interface is to tunnel communications associated with the functional safety operations between the embedded controller and the root of trust.

Example 8 includes the apparatus of Example 7, wherein the communications are to include data collection traffic.

Example 9 includes the apparatus of Example 7, wherein the root of trust includes one or more of a security unit or a power management unit.

Example 10 includes the apparatus of Example 7, wherein the root of trust includes an internal safety unit.

Example 11 includes the apparatus of any one of Examples 7 to 10, wherein the embedded controller is to power on before the SoC.

Example 12 includes the apparatus of any one of Examples 7 to 11, wherein the interface is an enhanced serial peripheral interface (eSPI).

Example 13 includes at least one computer readable storage medium comprising a set of instructions, which when executed by an embedded controller, cause the embedded controller to conduct functional safety operations with respect to a system on chip (SoC) including a root of trust, conduct non-functional safety operations with respect to the SoC, and tunnel communications associated with the functional safety operations to the root of trust via an enhanced serial peripheral interface (eSPI).

Example 14 includes the at least one computer readable storage medium of Example 13, wherein the communications are to include data collection traffic.

Example 15 includes the at least one computer readable storage medium of Example 13, wherein the communications are to be tunneled to a security unit in the root of trust.

Example 16 includes the at least one computer readable storage medium of Example 13, wherein the communications are to be tunneled to a power management unit in the root of trust.

Example 17 includes the at least one computer readable storage medium of Example 13, wherein the communications are to be tunneled to an internal safety unit in the root of trust.

Example 18 includes the at least one computer readable storage medium of any one of Examples 13 to 17, wherein the embedded controller is to power on before the SoC.

Example 19 includes a method of operating an embedded controller, comprising conducting, by the embedded controller, functional safety operations with respect to a system on chip (SoC) including a root of trust, conducting, by the embedded controller, non-functional safety operations with respect to the SoC, and tunneling communications associated with the functional safety operations from the embedded controller to the root of trust via an enhanced serial peripheral interface (eSPI).

Example 20 includes the method of Example 19, wherein the communications include data collection traffic.

Example 21 includes the method of Example 19, wherein the communications are tunneled to a security unit in the root of trust.

Example 22 includes the method of Example 19, wherein the communications are tunneled to a power management unit in the root of trust.

Example 23 includes the method of Example 19, wherein the communications are tunneled to an internal safety unit in the root of trust.

Example 24 includes the method of any one of Examples 19 to 23, wherein the embedded controller powers on before the SoC.

Example 25 includes means for performing any one of Examples 19 to 24.

Technology described herein may therefore facilitate OEM innovation and customization (e.g., FW kernel vs. OEM specific features) to implement and execute safety-related mission functionality and diagnostics. Additionally, the technology provides "safety island" controls that orchestrate safety functions with reference designs/binaries. Moreover, the technology enhances PMC/CSME/PUNIT FW services through an existing interface to allow services to be handled at root of trust components. In addition, process flows may be converged to reduce cost. With regard to communication interfaces, an eSPI interface on the EC/BMC may add value to architectural ecosystems for platform innovations and is an ideal interface for external safety islands. Indeed, merging the EC and safety agent provides the ability to have a common interface with the SoC. The technology also addresses cost by enabling the EC to perform both EC functionality and safety island functionality (e.g., paving the way to lower product cost of functional safety (FuSa) related features through reuse.

The technology described herein also enables enhanced/ augmented use cases. For example, an external safety agent enhances the safety island use-case portfolio in areas that are not supported with an integrated solution. Additionally, the technology eliminates safety monitoring blind spots. In this regard, the EC is the first chip to receive power (independent from SoC) and provides functionality before BIOS is operational. With regard to FW development and validation, EC vendors may use MECC (Modular EC card connector) for FW development and validation on most client platforms. Moreover, voltage/clocks are separated to provide measures for freedom from interference (FFI), including CCF.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/ or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
   a vehicle subsystem;
   a system on chip (SoC) coupled to the vehicle subsystem, the SoC including a root of trust;
   an embedded controller to conduct functional safety operations and non-functional safety operations; and an enhanced serial peripheral interface (eSPI) coupled to the SoC and the embedded controller, wherein the eSPI is to tunnel communications associated with the functional safety operations between the embedded controller and the root of trust.

2. The system of claim 1, wherein the communications are to include data collection traffic.

3. The system of claim 1, wherein the root of trust includes a security unit.

4. The system of claim 1, wherein the root of trust includes a power management unit.

5. The system of claim 1, wherein the root of trust includes an internal safety unit.

6. The system of claim 1, wherein the embedded controller is to power on before the SoC.

7. An apparatus comprising:
a system on chip (SoC) including a root of trust;
an embedded controller to conduct functional safety operations in compliance with one or more safety requirements and conduct non-functional safety operations; and
an interface coupled to the SoC and the embedded controller, wherein the interface is to tunnel communications associated with the functional safety operations between the embedded controller and the root of trust, wherein the interface is an enhanced serial peripheral interface (eSPI).

8. The apparatus of claim 7, wherein the communications are to include data collection traffic.

9. The apparatus of claim 7, wherein the root of trust includes one or more of a security unit or a power management unit.

10. The apparatus of claim 7, wherein the root of trust includes an internal safety unit.

11. The apparatus of claim 7, wherein the embedded controller is to power on before the SoC.

12. At least one non-transitory computer readable storage medium comprising a set of instructions, which when executed by an embedded controller, cause the embedded controller to:
conduct functional safety operations with respect to a system on chip (SoC) including a root of trust;
conduct non-functional safety operations with respect to the SoC; and
tunnel communications associated with the functional safety operations to the root of trust via an enhanced serial peripheral interface (eSPI).

13. The at least one non-transitory computer readable storage medium of claim 12, wherein the communications are to include data collection traffic.

14. The at least one non-transitory computer readable storage medium of claim 12, wherein the communications are to be tunneled to a security unit in the root of trust.

15. The at least one non-transitory computer readable storage medium of claim 12, wherein the communications are to be tunneled to a power management unit in the root of trust.

16. The at least one non-transitory computer readable storage medium of claim 12, wherein the communications are to be tunneled to an internal safety unit in the root of trust.

17. The at least one non-transitory computer readable storage medium of claim 12, wherein the embedded controller is to power on before the SoC.

18. A method comprising:
conducting, by an embedded controller, functional safety operations with respect to a system on chip (SoC) including a root of trust;
conducting, by the embedded controller, non-functional safety operations with respect to the SoC; and
tunneling communications associated with the functional safety operations from the embedded controller to the root of trust via an enhanced serial peripheral interface (eSPI).

19. The method of claim 18, wherein the communications include data collection traffic.

20. The method of claim 18, wherein the communications are tunneled to a security unit in the root of trust.

21. The method of claim 18, wherein the communications are tunneled to a power management unit in the root of trust.

22. The method of claim 18, wherein the communications are tunneled to an internal safety unit in the root of trust.

23. The method of claim 18, wherein the embedded controller powers on before the SoC.

* * * * *